May 18, 1943.  C. H. WHITE  2,319,758
PLANTING AND FERTILIZING MEANS
Filed Dec. 29, 1939  3 Sheets-Sheet 1
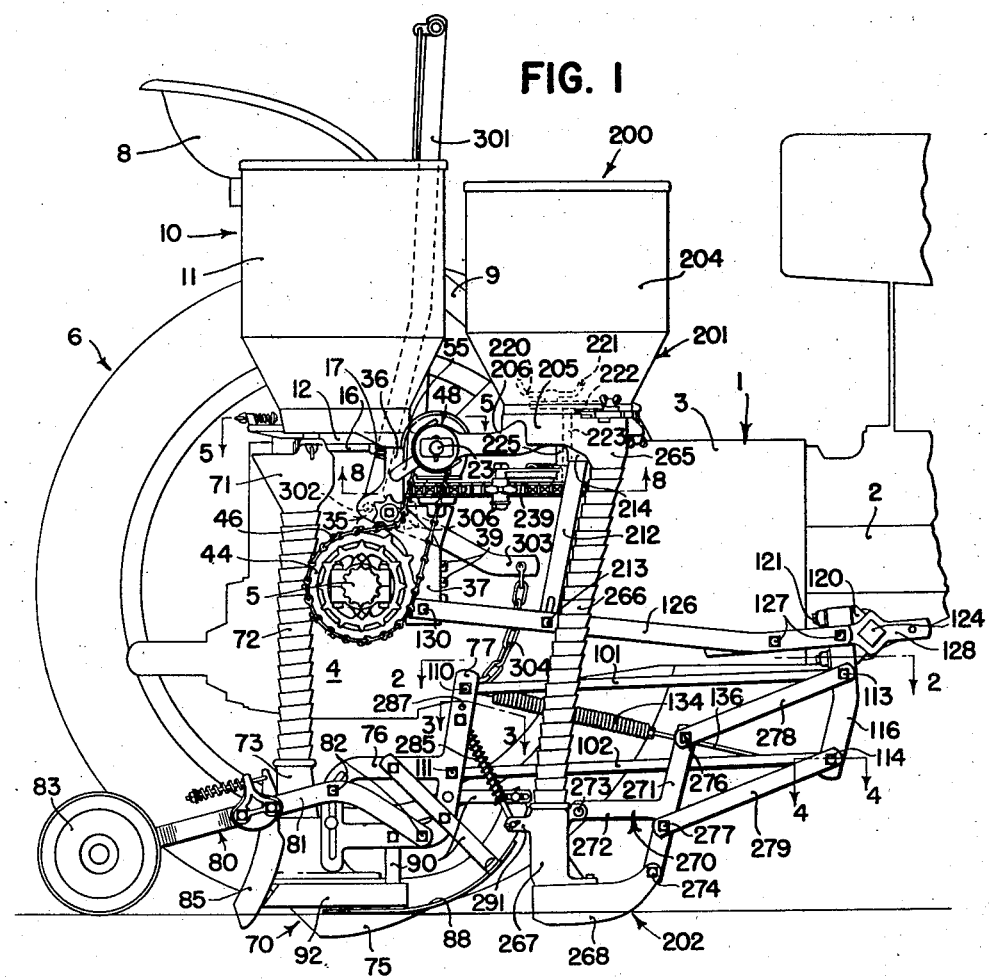
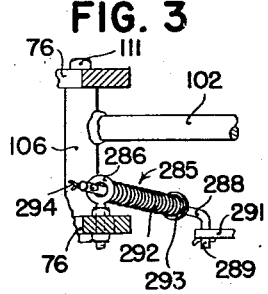
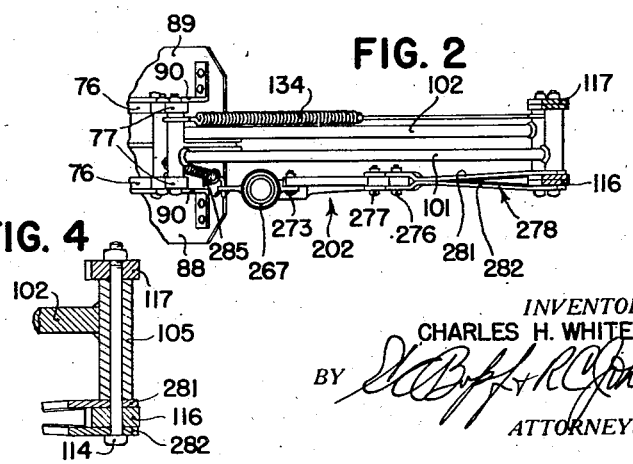
INVENTOR:
CHARLES H. WHITE
BY
ATTORNEYS.

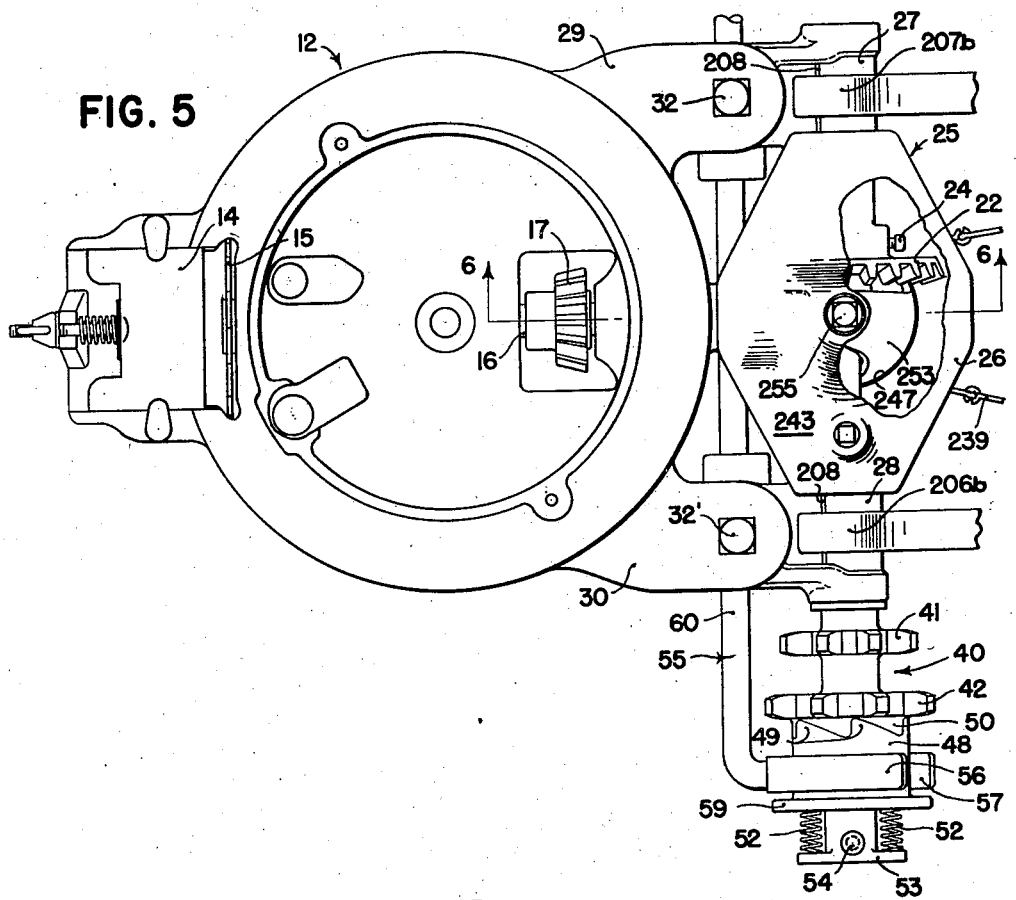
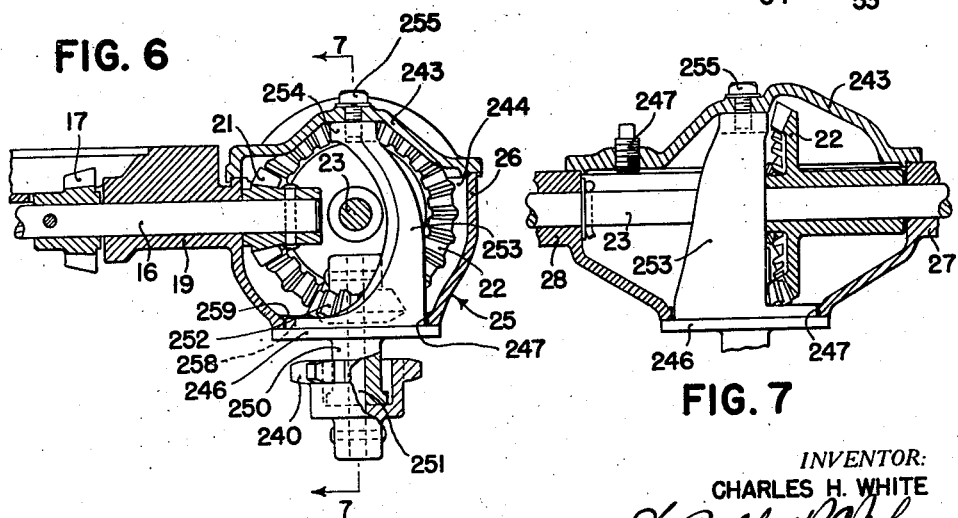

May 18, 1943.  C. H. WHITE  2,319,758
PLANTING AND FERTILIZING MEANS
Filed Dec. 29, 1939   3 Sheets—Sheet 3

INVENTOR:
CHARLES H. WHITE
BY
ATTORNEYS.

Patented May 18, 1943

2,319,758

UNITED STATES PATENT OFFICE 2,319,758

PLANTING AND FERTILIZING MEANS

Charles H. White, Moline, Ill., assignor to Deere & Company, Moline, Ill., a corporation of Illinois Application December 29, 1939, Serial No. 311,583

21 Claims. (Cl. 111—34)

This invention relates generally to agricultural machines and more particularly to planters adapted to be mounted on a tractor.

The object and general nature of this invention is the provision of a new and improved agricultural implement embodying a combined planter and fertilizer distributor, and a further feature of this invention is the provision of new and improved means for associating the planting and fertilizer units one with the other in operative relationship on the tractor. A further feature of this invention is the provision of new and improved means for driving the fertilizer agitating mechanism from the drive for the seeding mechanism.

An additional feature of the present invention is the provision of a planter and fertilizer attachment for each side of the tractor. It is also a feature of this invention to provide a fertilizer attachment particularly constructed and arranged to be mounted closely adjacent the planting unit, preferably forward thereof, and driven from the seeding mechanism drive by a simple sprocket and chain connection. A further feature of the invention is the provision of a driving connection that is simple, involves few parts, and is protected from dirt, grit and the like.

Still further, an additional feature of the present invention resides in a new and improved drive for the seeding mechanism in which a gear on the seeding shaft which drives the seed selecting mechanism is enclosed in a lubricant containing housing, whereby the drive gear and associated parts are protected from dirt, dust, grit and the like normally encountered during operation. It is a particular feature of the present invention to provide this construction where the planting and/or fertilizing units are carried by the tractor adjacent the rear wheels, which frequently lift dirt and the like and drop the same upon any adjacently positioned units. In this connection it is a further feature of this invention to provide new and improved means connecting the fertilizer attachment to the planting unit in operative relation therewith so that the fertilizer attachment derives power for its operation from the seeding shaft. More particularly, it is a feature of this invention to provide driving means for the fertilizer attachment, which driving means includes a driving sprocket chain disposed in a position substantially underneath the fertilizer and planter hopper bottoms and operatively connected in driving relation with the enclosed seeding shaft driving gear by a pinion and sprocket unit which is optionally attachable to the enclosing casing for the seeding shaft driving gear. Further, it is a feature of this invention to provide a closure member to take the place of said last mentioned unit when the fertilizer attachment is not present.

These and other objects and advantages of the present invention will be apparent to those skilled in the art after a consideration of the following detailed description of the preferred structural embodiment, taken in conjunction with the accompanying drawings.

In the drawings:

Figure 1 is a side view of a tractor equipped with planting and fertilizer distributing units, constructed and arranged according to the principles of the present invention, the near rear wheel and other parts of the tractor being omitted for purposes of clarity;

Figure 2 is a fragmentary view taken generally along the line 2—2 of Figure 1;

Figure 3 is a fragmentary view taken along the line 3—3 of Figure 1;

Figure 4 is a section taken along the line 4—4 of Figure 1, illustrating in particular the manner of connecting the fertilizer drawbar links to the tractor brackets to which the drawbar links of the planter runners are connected;

Figure 5 is an enlarged view looking downwardly on the hopper bottom and associated parts of the planting unit, Figure 5 corresponding generally to a view taken along the line 5—5 of Figure 1 with the planter hopper removed and the fertilizer attachment removed;

Figure 6 is a fragmentary sectional view taken generally along the lines 6—6 of Figure 5;

Figure 7 is a sectional view taken generally along the line 7—7 of Figure 6, certain parts being shown in elevation;

Figure 8:
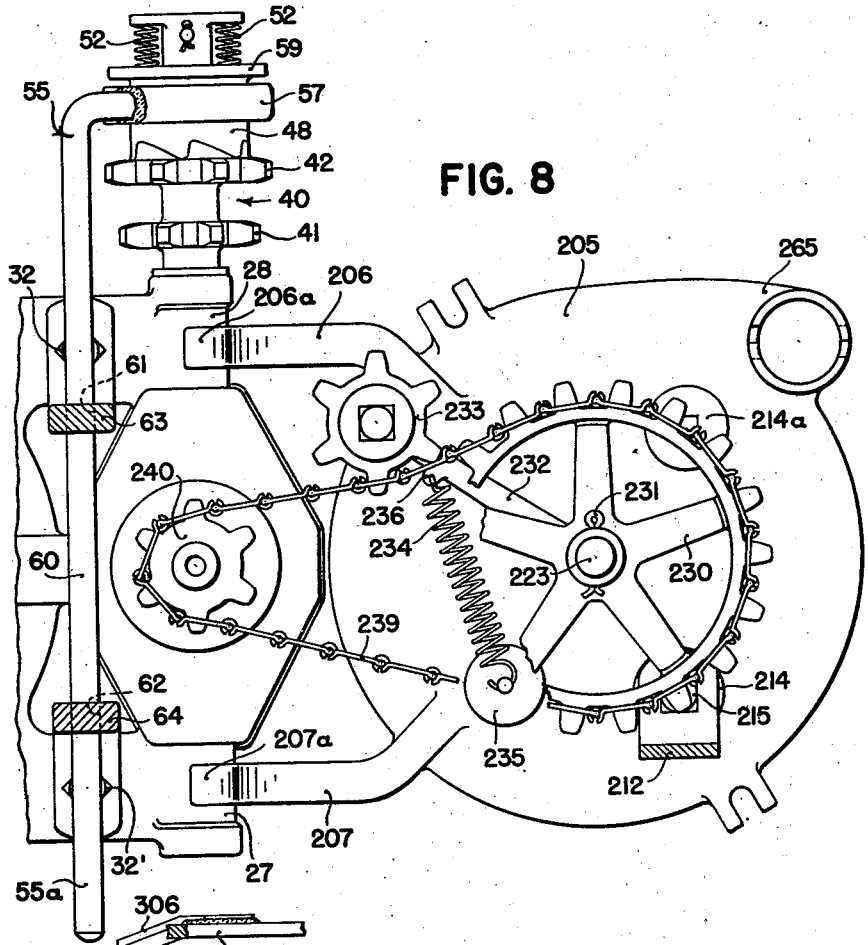
Figure 9:
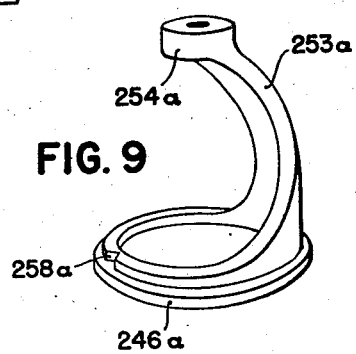

Figure 8 is a view, taken generally along the line 8—8 of Figure 1, looking upwardly at the bottom of the fertilizer hopper bottom and showing the means for driving the fertilizer agitating and feeding means from the seeding shaft; and Figure 9 is a perspective view of the closure member which is associated with the casing that encloses the seeding shaft and the planter drive gear, when the fertilizer attachment is not used.

Referring now more particularly to Figure 1 the reference numeral 1 indicates a farm tractor of more or less conventional construction, so far as the present invention is concerned, the tractor 1 including a frame structure 2 which includes a transmission housing 3, a rear axle housing 4 in which a pair of axle shafts 5 are journaled in laterally extending quill sections (not shown) of the axle housing, and rear traction wheels 6, the near wheel being removed in Figure 1, as mentioned above. The tractor 1 includes a seat 8 forming an operator's station, supported on a standard 9 which is connected to the tractor frame in any suitable manner.

The tractor 1 is arranged to receive a planting unit and a fertilizer attachment at each side, but since the planting unit and fertilizer attachment for one side of the tractor are substantially identical to the planting unit and fertilizer attachment, respectively, for the other side, only one such unit and fertilizer attachment have been shown in detail, the unit and attachment shown being for the right side of the tractor, as will be apparent from Figure 1.

The planting unit is indicated in its entirety by the reference numeral 10 and, being of the integral type, is mounted directly on the tractor. The unit 10 includes a planter hopper 11 supported on a supporting frame means in the form of a hopper bottom 12, certain details of which are shown in Figure 5 and described below. The unit 10 shown in the drawings is particularly adapted for planting corn and cotton seed, and includes seed selecting mechanism and driving means therefor. The seed selecting mechanism includes an adjustable gate 14 and a picker wheel 15 fixed to one end of a seeding shaft 16 to which a pinion 17 is fixed. The latter serves to drive a seed plate (not shown) supported for rotation on the hopper bottom 12. The shaft 16 is extended beyond the pinion 17, being supported in suitable bearing sections 19 (Figure 6) formed on or carried by the hopper bottom 12, and receives a drive pinion 21 pinned or otherwise fixed to the shaft 16. A drive gear 22 meshes with the drive pinion 21 and is fixed to a seeding shaft 23 by any suitable means, such as a set screw 24 (Figure 5). The shafts 16 and 23, together with the associated gearing and supporting housing or frame, preferably integral with the hopper bottom and referred to below, comprise driving means for the seed selecting mechanism.

The hopper bottom 12 is formed with a casing or frame 25 which is enlarged, as at 26, to receive the drive gear 22 and which includes bearing sections 27 and 28 in which the seeding shaft 23 is journaled for rotation. The hopper bottom 12 has portions 29 and 30 extending between the main body of the hopper bottom 12 and the casing sections 27 and 28, respectively, the extensions 29 and 30 being apertured to receive bolts 32 and 32' by which the hopper bottom 12 and associated parts are fixed to a bracket 35 (Figure 1), the upper section 36 of which is offset with respect to the lower section 37 so as to dispose the hopper 11 substantially directly above the lateral extension of the axle housing 4. Preferably, the lower section 37 is bolted, as at 39, to the forward side of the axle housing 4.

The seeding shaft 23 is driven by a suitable connection to the axle shaft at that side of the tractor. To this end, a double sprocket gear member 40, having two sprocket gear sections 41 and 42, is mounted rotatably on the laterally outer end of the seeding shaft 23, as shown in Figure 5, and as shown in Figure 1, a double driving sprocket member 44 is fixed to the axle shaft 5. A driving sprocket chain 46 is trained over the sprocket gear member 44, and over the associated sprocket gear section, 41 or 42, of the driven sprocket gear member 40. A shiftable clutch member 48 is keyed or splined onto the outer end of the shaft 23 so as to be non-rotatable with respect thereto and is formed with clutch teeth 49 which cooperate with companion clutch teeth 50 formed on the outer end of the sprocket gear member 40. One or more springs 52 are disposed between the outer face of the clutch sleeve 48 and collar 53 fixed, as at 54, to the outer end of the shaft 23. The two sets of clutch teeth 49 and 50 and the cooperating parts of the members 40 and 48 constitute a clutch.

Mechanism for controlling the shiftable clutch member 48 preferably takes the form of a laterally shiftable fork 55, the laterally outer ends 56 (Figure 5) and 57 (Figure 8) of which are spaced apart to embrace the shiftable clutch sleeve 48. A collar 59 is carried by the clutch member 48 adjacent the outer end so as to form an abutment against which the clutch fork 55 may bear when the latter is shifted transversely to disengage the clutch. The clutch controlling member 55 includes a shank section 60 which extends transversely of the tractor from the inner side to the outer side of the planter supporting bracket 35, being slidably mounted in apertures 61 and 62 formed in arm sections 63 and 64 of the bracket. The inner squared end of the collar 53 prevents the sprocket gear member 40 from shifting laterally outwardly along the seeding shaft 23 when the clutch member 48 is shifted outwardly by the fork 55 against the tension of the springs 52. The mechanism for shifting the fork 55 will be described below. As will be understood, disengaging the clutch 49, 50, interrupts the drive from the axle shaft 5 to the seeding shaft 23.

A furrow opener unit is indicated in Figure 1 by the reference numeral 70 and is disposed in a position substantially directly underneath the lateral extension of the rear axle housing 4 and the hopper 11. The hopper bottom 12 is formed to receive a funnel-shaped spout top 71 which directs the seed selected into a longitudinally extensible seed tube 72 which at its lower end leads into the shank 73 of the furrow opener unit 70. The latter unit includes a furrow opening runner 75 to which a pair of opener frame members 76 are fixed by any suitable means, each opener frame including upwardly extending apertured sections 77. A press wheel frame 80, comprising a pair of bars 81 welded together at their rear ends and spaced apart and apertured at their forward ends, is bolted, as at 82, to the opposite sides of the furrow opener unit 70 and at its rear end rotatably receives a pair of press wheels 83 of usual construction. A pair of knife conveyers 85 are resiliently connected to the press frame bars 81 in the usual way. Since each furrow opener unit 70 is floatingly connected, as will be explained below, with the tractor, each runner 75 is provided with right and left hand gauge shoes 88 and 89 (Figures 1 and 2) which are connected by braces 90 to the runner frame members 76. Where necessary, gauge shoe sweeps 92 are fixed on opposite sides of the runner 75.

Suitable connections extend between each furrow opener unit 70 and the tractor and permit each furrow opened to have vertical movement relative to the tractor, this being permitted since the seed tube or spout 72 is formed of flexible ribbon which does not interfere with the movement of the furrow opener 70 relative to the spout top 71 which is carried in fixed relation on the tractor, being connected to the hopper bottom 12 which is mounted on the bracket 35, as described above. The means connecting each furrow opener unit 70 with the tractor does not, per se, form a part of the present invention, except in combination therewith, being disclosed and claimed in the copending application of Orville F. Drennan, filed December 29, 1939, S. N. 311,586. It is therefore sufficient to point out that such connecting means includes a pair of generally parallel drawbar links 101 and 102. At their rear ends the drawbar links 101 and 102 receive pivot bolts 110 and 111, the bolts 110 and 111 being disposed in suitable apertures formed in the runner frame extensions 77. At the forward ends the links 101 and 102 receive pivot bolts 113 and 114 which are carried by a pair of tractor drawbar brackets 116 and 117, each consisting of a pair of spaced and apertured plates offset at their upper ends and receiving therebetween a clamp casting 120 in apertures in which a U-bolt 121 is received. The U-bolts 121 serve to fix the tractor brackets 116 and 117 to a draft frame or drawbar 124 which is fixed to the side of the tractor frame 2 in any suitable manner. A brace 126 (Figure 1) is bolted, as at 127, to a bar 128 which is welded or otherwise permanently fixed to the outer end of the draft bar 124, and at its rear end the brace 126 is bolted, as at 130, to the lower section 37 of the planter supporting bracket 35, as best shown in Figure 1. If desired, the two bars 126 and 128 may be formed of one piece, in which case the bolts 127 will be eliminated.

As mentioned above, by virtue of the parallel linkage 101, 102, the furrow opener units 70 are floatingly connected with the tractor 1. When operating in hard ground it may be that the weight of the runner units 70 is not sufficient to cause the same to penetrate to the desired depth. To provide for this condition, a pressure spring 134 is connected at its rear end with the upper rear pivot 110, and at its forward end the spring 134 is connected by an adjusting bolt 136 with the lower forward pivot 114. This construction is disclosed in more detail and claimed in the above mentioned copending application. As will be understood, the tension in the spring 134 exerts a downward pull or component of force against the rear end of the upper link 101, tending to press the associated furrow opener unit 70 into the ground until the gauge shoes 88 ride along the surface of the ground.

Under other conditions of operation, as when planting in loosely thrown up beds, it may be desirable to exert a force tending to hold up the furrow openers or runners to prevent them from operating too deeply. As pointed out in the above mentioned copending application, if such is the case, the spring 134 and associated parts are arranged with the forward end of the link 136 connected to the upper forward pivot 113 and with the rear end of the spring 134 connected to lower rear pivot 111. It is therefore a matter of only a moment's time to place the spring 134 in either of its optional positions to accommodate the planting unit to the conditions present.

The structure so far described comprises a planting implement, there being one of the units 10, 70, with associated parts at each side of the tractor. The hopper and seed selecting mechanism is supported firmly on the tractor, directly on the rear axle housing 4, and the furrow openers 70 are floatingly connected to the tractor carried drawbar 124 and brackets 116 and 117 by the generally parallel links 101, 102.

According to the principles of the present invention a fertilizer attachment is provided for operative association with the planting implement and is indicated in its entirety by the reference numeral 200 in Figure 1. The fertilizer attachment 200 consists of dispensing means including a hopper and fertilizer distributing unit 201 and a fertilizer furrow opened unit 202, together with associated driving connections. The fertilizer hopper 204 is carried on a hopper frame or hopper bottom 205 and is provided with a pair of attaching arms 206 and 207, best shown in Figure 8, which is a view looking upwardly at the under side of the hopper unit 201. The rear ends of the arms 206 and 207 are forked, as indicated at 206a and 207a, so as to embrace and be connected to the hopper frame or hopper bottom 12 of the planting unit 10 through the bearing sections 27 and 28 of the gear casing 25 (see Figure 5). To this end, the upper portions 206b and 207b (Figure 5) of the forked arm sections 206a and 207a are adapted to engage over abutment shoulders 208 formed on the casing sections 27 and 28, as shown in Figure 5. In addition, a brace member 212 extends downwardly from the fertilizer hopper bottom 205 to the longitudinally extending brace 126, being bolted at its lower end, as at 213, to the brace 126. At its upper end the brace member 212 is bent laterally and is bolted or otherwise secured to the fertilizer frame or fertilizer hopper bottom 205. To this end, the hopper bottom 205 is provided with a boss 214. Preferably, there are two bosses, one for right hand mounting and one for left hand mounting. The left hand mounting boss is shown at 214a in Figure 8.

The bolt means securing the upper end of the brace 212 to the fertilizer hopper bottom 205 is indicated at 215 in Figure 8.

The fertilizer hopper 204 is adapted to contain fertilizer which is distributed by suitable agitating means indicated in dotted lines by the reference numeral 220 in Figure 1. The particular details of the agitating means 220 do not per se form a part of the present invention, and hence extended description is unnecessary. It will be sufficient to note that an upper agitator 221 is mounted eccentrically upon a lower agitator 22, the latter being fixed to the upper end of a vertical shaft 223 (Figure 8) which is mounted for rotation in a vertical boss 225 (Figure 1) depending from the fertilizer hopper bottom 205.

The fertilizer distributing or agitating means is driven through mechanism which is brought into operative association with the driving gear 22 of the seeding mechanism when the hopper unit 201 is brought into position and held in place by the arms 206 and 207 and the brace 212. This driving mechanism will now be described.

Secured to the lower end of the shaft 223 is a sprocket gear member 230. This member is secured, as by a cotter key 231, to the lower end of the shaft 223, upward movement of which is limited by the engagement of the sprocket gear member 230 with the lower end of the boss 225 (Figure 1). An idler arm 232 embraces and is pivoted on the lower end of the boss 225, and at its outer end the arm 232 carries an idler sprocket gear 233. A spring 234 is anchored at one end to a boss 235 on the fertilizer hopper bottom and at its other end is connected to a lug 236 formed on the arm 232. The spring 234 biases the idler sprocket 233 for movement in one direction. The idler sprocket 233 engages a driving chain 239 which is trained around the sprocket gear member 230 and around another sprocket gear member 240 in the form of a sprocket pinion which is rotated from the seeding unit by means which will now be described.

Referring more particularly to Figures 5, 6 and 7, it will be noted that the casing 25 for the drive gear 22 includes an upper gear case cover 243 which serves as closure for an upper opening 244 (Figure 6) of the casing 25 and a lower closure member or gear case bottom cover 246 for a lower opening 247 of the casing 25. The upper cover 243 is provided with a threaded hole and a screw plug 247 whereby lubricant may be introduced into the casing 25. The gear case bottom cover 246 is of particular construction. It is provided with a tubular extension 250 which serves as a bearing or journal for a stub shaft 251 to the lower end of which the driving pinion gear member 240 is secured in any suitable manner. At its upper end a second pinion member 252 is secured, the pinion 252 being in the form of a bevel gear which meshes with the drive gear 22 that is fixed to the seeding shaft 23 and drives the seed selecting mechanism pinion 21. An extension 253 is formed on the gear case bottom cover 246 and is curved so as to clear the seeding shaft 23. The extension terminates upwardly in a threaded boss 254 against which the upper cover 243 is received. A cap screw 255 is inserted through an opening in the upper cover member 243 and is threaded into the opening in the boss 254. When the cap screw 255 is tightened, both upper and lower gear case cover members 243 and 246 are securely held in position on the casing 25, and since the lower cover member 246 is held in position, the pinion 252 is held in meshing relation with the drive gear 22. The lower gear case cover 246, which is in the nature of a closure plate, thus not only seals the lower opening 247 but in addition holds the driving means 252, 251, 240 for the fertilizer attachment in operative association with the seeding shaft drive gear 22. As a unit, therefore, the gear case bottom cover 246, together with the bevel pinion 252, the shaft 251 and the driving sprocket gear member 240, constitute a part of the fertilizer attachment. Preferably, the extension 253 is formed integral with the closure plate section 246 and the tubular journal section 250, but these parts may be made separately as desired. In order to insure that the gear case bottom closure member 246 is applied and held in the correct position, a notch 258 is formed in the closure member 246 and is engageable with a lug 259 formed on the gear case 25. The engagement of the lug in the notch serves to locate or position the gear case bottom closure member 246, as will be readily understood.

When it is desired to use the planting mechanism without the fertilizer attachment, the latter, which is readily detachable, is removed, together with the gear case bottom closure 246 and associated parts. In its place an auxiliary gear case bottom closure member 246a, best shown in Figure 9, is installed. The member 246a is of substantially the same construction as the member 246, except that the bearing extension 250 is eliminated, and hence the same reference numerals with the suffix a have been employed in Figure 9. This figure also shows the location of the positioning recess 258a and the formation of the closure member extension 253a, which correspond with the extension 253 and the recess 258 shown in Figure 6. It is of course not necessary, when removing the fertilizer attachment, to remove the gear-supporting closure member 246 and replace it with the closure member 246a, since there is no objection to leaving the unit 246 in place. However, the provision of the closure member 246a makes possible certain manufacturing economics since it is not necessary to include the unit 246 when supplying a unit for planting only. The unit 246 can then be supplied as a part of the fertilizer attachment.

The fertilizer hopper bottom 205 is provided with a fertilizer spout section 265 (Figures 1 and 8) and a fertilizer tube 266 of the flexible ribbon type is connected at its upper end to the spout section 265 and at its lower end to a fertilizer opener shank 267 which forms a part of the fertilizer opener unit 202 (Figure 1). The runner of the fertilizer opener unit is indicated at 268. A fertilizer opener frame member 270 of welded construction, embodying a generally vertical member 271 and a horizontal rearwardly extending member 272, is bolted, as at 273 and 274, to the opener shank 267 and the forward end of the runner 268 so as to form a part of the fertilizer furrow opener 202. The vertical section 271 is apertured to receive a pair of pivot bolts 276 and 277 by which upper and lower link members 278 and 279 are connected to the fertilizer furrow opener 202.

The particular details of the fertilizer runner connections are disclosed and claimed in the above mentioned copending application. It will therefore be sufficient to note that each of the link members 278 and 279, as best shown in Figure 2, comprises a pair of strap members 281 and 282, the forward ends of which are disposed on opposite sides of the outer tractor supported draft bracket 116. The forward ends of the straps 281 and 282 of both links 278 and 279 are apertured so as to receive and be pivotally connected to the bracket 116 by the pivot bolts 113 and 114 which, respectively, pivotally connect the planter furrow opener link members 101 and 102 to the tractor.

As also disclosed and claimed in the above mentioned copending application, spring means 285 (Figure 1) is connected between the planter furrow opener 70 and the fertilizer furrow opener 202 for yieldingly holding the latter in position by the former, whereby the biasing spring means associated with the planter furrow opening may be effective also against the fertilizer furrow opener associated therewith. The spring means 285 includes an eyebolt member 286 adapted to be fixed to the outer of the planter runner frames 76, to which end the vertical extension 77 thereof is provided with one or more openings 287 (Figure 1). Slidably mounted in the eyebolt member 286 is a rod member 288, the upper end of which extends through the eye of the member 286, while the lower end is bent laterally, as indicated at 289, and is extended through the aperture in a lug 291 which is secured to or formed as a part of the fertilizer opener shank 267. A spring 292 embraces the upper end of the rod member 288 and at its upper end bears against the eyebolt member 286 and at its lower end bears against a collar 293 welded or otherwise fixed to the rod 288. A pin or cotter key 294 is carried at the upper end of the rod member 288, as best shown in Figure 3, so that the downward movement of the rod member 288 relative to the fixed member 286 is limited, and hence the effect of the spring 292 in urging the fertilizer furrow opening 202 downwardly relative to a planter fertilizer opener 70 is likewise limited.

A hand lever 301 (Fig. 1) is pivotally mounted, as at 302, on the planter supporting bracket 35 and has a forwardly extending portion 303 which is connected by a chain 304 to the furrow opener runner frame 76. The lever 301 is provided with suitable detent mechanism, not shown, and as will be clear from Figure 1, swinging the lever 301 rearwardly about the pivot 302 raises the forward end 303 upwardly, thereby raising the planter furrow opener 70. The upward movement of the latter acts through the interconnecting spring means 285 to also raise the fertilizer furrow opener unit 202. The movement of the hand lever 301 is made use of for automatically disconnecting the drive from the axle shaft 5 to the seeding shaft 23. To this end, the forward portion 303 of the hand lever 301 carries a cam 306 (Figure 8) which is shaped so as to engage and shift the inner end 55a of the clutch fork 55, so that when the hand lever 301 is moved rearwardly, the clutch fork 55 is automatically shifted laterally outwardly (upwardly as viewed in Figure 8) thereby disconnecting the clutch 49, 50 and interrupting the drive from the axle shaft 5 to the seeding shaft 23. As will be understood, this stops the operation of both the planting mechanism and the fertilizer mechanism since the latter is connected to the former and driven thereby from the seeding shaft 23 as described above.

The operation of the structure described above is believed to be apparent. Briefly, the planting unit 10 is fastened in place directly on the tractor axle housing by the mounting bracket 35, and the planter furrow opener unit 70 is floatingly connected with the tractor through the generally parallel link means 101 and 102. The seed selecting mechanism of the planting unit is driven from the drive shaft gear 44 by means of the sprocket chain 46 which, under the control of the clutch means 49, 50, serves to drive the seeding shaft 23. The gear 22 fixed to the latter then drives the shaft 16 which, in turn, drives the seed plate and/or the picker wheel 15. The furrow opener unit 70 may be raised and lowered by the hand lever 301 which automatically engages and disengages the clutch 49, 50, when the cam section 306 on the forward arm 303 of the hand lever 301 engages the end 55a of the shift fork 55. When it is desired to apply pressure to force the furrow opener units 70 into the ground with a force that is greater than their own weight, the springs 134 are arranged as indicated in Figure 1, and when it is desired to apply a lifting force to the furrow openers 70 to reduce their tendency to penetrate into soft or loose soil, the springs are reversed.

When the fertilizer attachment is to be used, the closure member 246a (Figure 9) is replaced by the closure member and gear unit 246 which forms a part of the fertilizer attachment driving connections which are brought into operative relation when the arms 206 and 207 of the fertilizer hopper bottom are engaged with the planter hopper bottom or supporting frame and the brace 212 fastened in position. The latter is supported by the longitudinal brace 126 which serves, in addition, to reenforce the tractor draft frame means 124 when the fertilizer furrow openers 202 are link-connected thereto. By connecting the fertilizer draft links 278 and 279 to the outer tractor bracket 116 the fertilizer opener 202 associated therewith is disposed in the proper position, laterally and forwardly, relative to the planter furrow opener, and when the latter is raised the spring units 285 also raise the furrow opener units 202 associated therewith.

While I have shown and described above the preferred structure in which the principles of the present invention have been embodied, it is to be understood that my invention is not to be limited to the particular details shown and described above, but that, in fact, widely different means may be employed in the practice of the broader aspects of my invention.

What I claim, therefore, and desire to secure by Letters Patent is:

1. A fertilizer attachment for a planter or the like having seed selecting mechanism, driving means including a driving part and a supporting frame receiving and at least partially enclosing said driving part, said attachment including a fertilizer distributing mechanism, a rotatable gear member therefor, a sprocket chain for driving the same, and means including a part adapted to be mounted on said supporting frame for connecting said sprocket chain in driving relation with said enclosed driving part.

2. A fertilizer attachment for a planter or the like having seed selecting mechanism, driving means including a driving part and a supporting frame receiving and at least partially enclosing said driving part, said attachment including a fertilizer distributing mechanism, a rotatable gear member therefor, a sprocket chain for driving the same, a gear adapted to be disposed in and mounted on said supporting frame in driving relation with said driving part, and a driving sprocket pinion driven with said gear and receiving said sprocket chain, whereby said rotatable gear member is adapted to be driven by said chain from said sprocket pinion.

3. A fertilizer attachment for a planter or the like having seed selecting mechanism, a driving gear for the latter, and a supporting frame receiving said driving gear, said attachment including a fertilizer distributing mechanism, a rotatable gear member therefor, frame engaging means for detachably connecting said fertilizer attachment to said planter supporting frame, and means for connecting said rotatable gear member in operative association with said driving gear for the seed selecting mechanism, whereby said fertilizer distributing mechanism derives power from said seed selecting driving gear, said connecting means comprising a gear adapted to mesh with said driving gear, and flexible means connecting said driving gear with said rotatable gear member.

4. An agricultural machine comprising a planting unit having seed selecting mechanism, a driving gear for driving said seed selecting mechanism, and a casing having an opening at one side for enclosing said gear, a fertilizer attachment unit having fertilizer distributing mechanism and a sprocket gear for operating the same, means detachably connecting said fertilizer attachment unit to said planting unit so as to position said sprocket gear in operative association with said seed selecting unit driving gear, a plate for closing the opening in said casing, a rotatable member carried by said plate and having a pinion at one end and a driving sprocket gear at the other, means fixing said plate to said casing with said pinion in mesh with said seed selecting unit driving gear, and a sprocket chain trained over said sprocket gears.

5. A fertilizer attachment for a planter or the like having seed selecting mechanism, a driving part for the latter and a casing for said driving part, said attachment including fertilizer distributing mechanism, a rotatable gear member for actuating said latter mechanism, and means on said fertilizer attachment engageable with said casing to connect said fertilizer attachment to said casing and to dispose said rotatable gear member in a position to be connected with the driving part for said seed selecting mechanism.

6. A fertilizer attachment as defined in claim 5, further characterized by means for driving said rotatable gear member from said driving part, comprising a rotatable drive member adapted to be operatively connected with said driving part, a support for said rotatable drive member, means for fixing said support to said casing, and a driving connection between said rotatable drive member and said rotatable gear member.

7. In a planter having seed selecting mechanism and means for driving the same including a seeding shaft, a gear thereon, and a casing enclosing said gear, a fertilizer attachment comprising a fertilizer hopper having a hopper bottom, fertilizer distributing mechanism including a rotatable shaft extending generally vertically through said hopper bottom, a driving sprocket gear therefor fixed to the lower end of said shaft, a gear case bottom adapted to be attached to said casing and carrying a rotatable pinion and a sprocket gear, and a fertilizer drive chain trained over said sprocket gears, said pinion being adapted to mesh with said seeding shaft gear when said gear case bottom is secured in place on said casing.

8. In an agricultural implement, a shaft, a gear fixed to said shaft, a gear case enclosing said gear and the adjacent portions of said shaft, said casing having an opening at one side, a closure member for closing said opening, said closure member having an extension extending within said casing alongside said shaft generally toward the opposite side of said casing, and means connecting the opposite side of said casing with said extension for fixing said closure member in position.

9. In an agricultural implement, a shaft, a drive gear fixed thereto, a casing enclosing said gear and the adjacent portions of said shaft, said casing having a relatively large opening at one side and a relatively small opening at the opposite side, said shaft being disposed between said openings, a closure member having a plate section adapted to close said first opening and provided with an extension formed to clear said shaft and to extend substantially across said casing to said relatively small opening, and means extending through said latter opening and connected with the end of said extension for clamping said closure member in position.

10. In a planting mechanism, a seeding shaft, a drive gear fixed thereto, a casing enclosing said gear and having a relatively large opening, a closure member for closing said opening, said closure member having a bearing portion, a shaft journaled therein, and a gear member fixed to each end of said shaft, one of said gear members meshing with said drive gear when said closure member is clamped in position over said opening in said casing.

11. The combination with a tractor planter adapted to be connected to a tractor having a laterally extending part and including a hopper and a hopper bottom adapted to be fixed to said part, seeding mechanism supported by said hopper bottom, and a part for driving said mechanism, of a fertilizer attachment comprising a fertilizer hopper and a hopper bottom, fertilizer agitating means movably supported by said fertilizer hopper bottom, means for driving said agitating means including a sprocket disposed underneath said fertilizer hopper bottom, means on said fertilizer hopper bottom for detachably connecting the latter with said planter hopper bottom, and means for driving said sprocket from said driving part comprising a sprocket pinion adapted to be rotatably supported by said planter hopper bottom and operatively connected to be driven from said driving part, and a sprocket chain trained over said sprocket pinion and said sprocket.

12. A planter comprising a seed selecting unit having seed selecting mechanism, a seeding shaft and a gear thereon for driving said mechanism, and a casing formed to enclose said driving gear and having spaced bearing portions at its opposite ends to receive said seeding shaft, a fertilizer attachment comprising a frame and a fertilizer distributing member, means for securing the frame of the fertilizer attachment to the spaced bearing portions of said casing, and means for driving said fertilizer distributing member from said gear, including a part extending into said casing and meshing with said gear.

13. In a planter having a seeding shaft, a gear thereon and a casing enclosing said gear and having an opening in the lower part, a fertilizer attachment comprising a fertilizer hopper having a rotatable shaft extending downwardly from the hopper bottom, a closure member for said casing adapted to close said opening, a shaft extending downwardly from said closure member below said casing, a gear member on the inner end of said last mentioned shaft adapted to mesh with said gear, and means connecting the lower ends of said shafts for driving one from the other.

14. In a planter, a seeding shaft having a gear thereon, a gear case enclosing said gear and having an opening in one side thereof, a closure for said opening, a rotatable shaft carried by said closure and carrying a gear member at its inner end adapted to mesh with said gear, and means carried by said closure and extending across said gear case to the other side of the latter for attachment thereto for holding said closure member in position and said gear member engaged with said gear.

15. In a planter, a gear case, a seeding shaft extending transversely therethrough, a bevel gear on said shaft, said gear case having an opening at one side to provide access to said bevel gear, a closure for said opening having a bearing sleeve, a stub shaft journaled in said bearing sleeve, a bevel pinion on the inner end of said stub shaft and adapted to mesh with said bevel gear, and an arm carried by said closure member and extending across said gear case and secured to the side opposite said opening when the closure is in place, the end of said arm being disposed substantially in line with the axis of said openings, whereby said arm serves to hold said bevel pinion against axially outward displacement relative to said bevel gear.

16. In a planter having seed selecting mechanism and means for driving the same including a seeding shaft and a gear thereon and support means for said shaft, a fertilizer attachment comprising a fertilizer hopper having a hopper bottom, fertilizer distributing mechanism including a rotatable shaft extending generally vertically through said hopper bottom, a driving sprocket gear therefor fixed to the lower end of said shaft, a drive gear assembly adapted to be attached to said support means and carrying a rotatable pinion and a sprocket gear, and a fertilizer drive chain trained over said sprocket gears, said pinion being adapted to mesh with said seeding shaft gear when said drive gear assembly is attached to said support means.

17. In an agricultural implement, a gear assembly including a closure plate having a bearing section, a shaft journaled therein, a gear member on the shaft at the inner side of said plate, and an arm fixed to the closure plate at the inner side thereof and to one side of said gear member, said arm having at its end an attaching section disposed substantially in line with the center of said closure plate.

18. In an agricultural implement, a gear assembly including a closure plate and an arm fixed to the closure plate at the inner side thereof and having at its end an attaching section disposed substantially in line with the center of said closure plate.

19. In an agricultural implement having a casing, a shaft member journaled therein, and a gear fixed on said shaft member within said casing, the casing having an opening at one side adjacent said gear providing access to the latter, a gear assembly for attachment to said casing, comprising a closure plate adapted to close said opening and having a bearing section, a shaft journaled therein, a gear member on the shaft at the inner side of said plate, said gear member being adapted to mesh with said gear, and an arm fixed to the closure plate at the inner side thereof and to one side of said gear member, and extending along one side of said gear to the side of said casing opposite said opening, said arm having at its end an attaching section disposed substantially in line with the center of said closure plate and the axis of said shaft.

20. In an agricultural implement, a shaft, a gear fixed to said shaft, a gear casing enclosing said gear and the adjacent portions of said shaft, said casing having an opening at one side, a closure member removably secured over said opening for closing the latter, said closure member having an extension extending within said casing to one side of said shaft to a point on said casing spaced from said opening, and means connecting said extension to said casing for fixing said closure member in position over said opening.

21. In a planter having a seeding shaft, a gear thereon and a casing enclosing said gear and having an opening therein, a fertilizer attachment comprising a fertilizer hopper having a rotatable shaft carried thereby, a closure member for said casing adapted to close said opening, a shaft extending from said closure member, a gear member on the inner end of said last mentioned shaft adapted to mesh with said gear, and means connecting said shafts for driving one from the other.

CHARLES H. WHITE.